Feb. 2, 1932.  E. A. DUNLAP  1,843,113
PRESSURE GREASE GUN
Filed Aug. 4, 1930  2 Sheets-Sheet 1
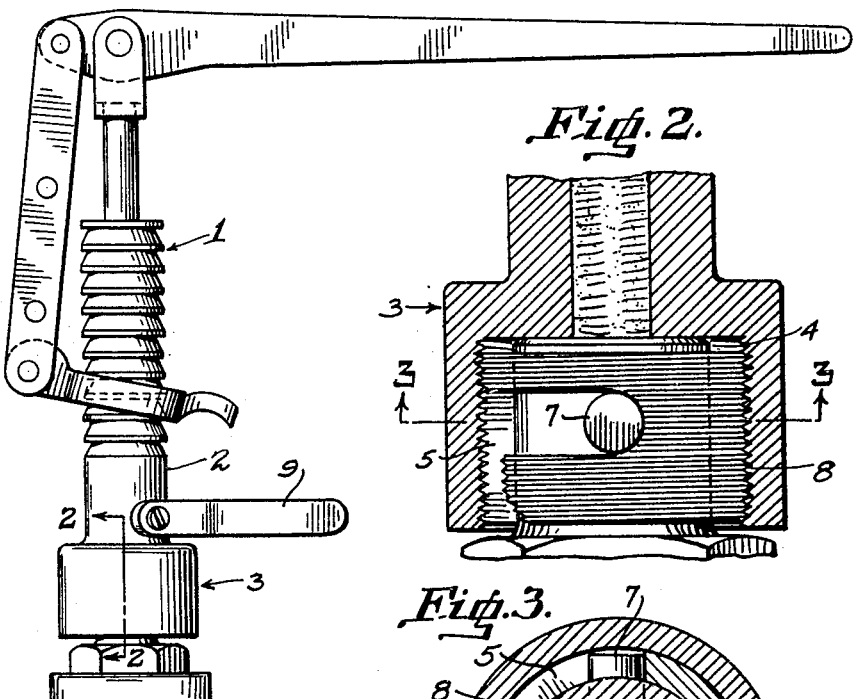
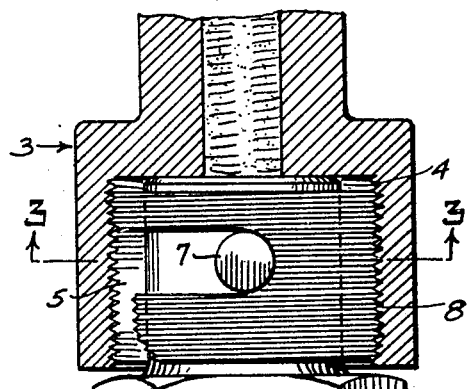
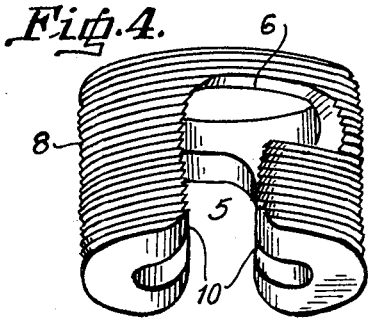
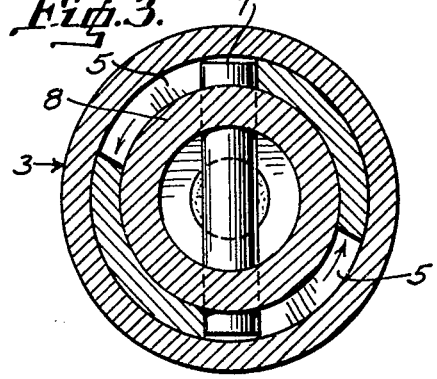
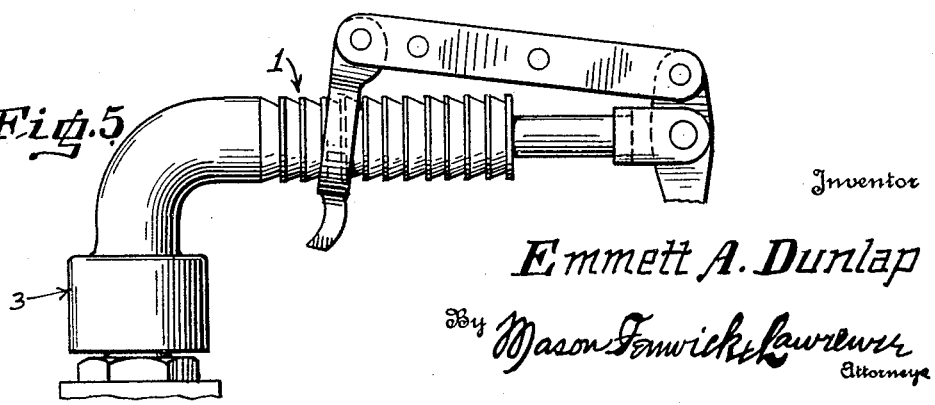
Inventor
Emmett A. Dunlap
By Mason Fenwick & Lawrence
Attorneys Feb. 2, 1932.    E. A. DUNLAP    1,843,113
PRESSURE GREASE GUN
Filed Aug. 4, 1930    2 Sheets-Sheet 2

Inventor
Emmett A. Dunlap
By Mason Fenwick Lawrence
Attorneys

Patented Feb. 2, 1932

1,843,113

UNITED STATES PATENT OFFICE

EMMETT ADDISON DUNLAP, OF FORT WORTH, TEXAS, ASSIGNOR TO RELIANCE MACHINE & STAMPING WORKS, INC., OF NEW ORLEANS, LOUISIANA, A CORPORATION OF LOUISIANA

PRESSURE GREASE GUN

Application filed August 4, 1930. Serial No. 472,953.

This invention relates to grease guns, and particularly to that type of grease gun which is adapted to make quick detachable connection with a fixed fitting on the part to be lubricated by means of a bayonet slot or its equivalent on one of the members, and a pin or its equivalent on the other.

It is the common history of grease guns of this type that after a period of use, the pin or the co-acting faces of the bayonet slot become worn so that the inner wall of the socket at the base of the grease gun no longer abuts with sealing fit against the outer face of the nipple or fitting on the part to be lubricated, resulting in extrusion of grease externally of the fitting.

The present invention has for its object the provision of an improvement in grease guns of this type whereby any wear of the parts resulting in the defect above mentioned is compensated for automatically in the course of the rotary movement of the coupling by which its connection to the fitting is accomplished.

It is obvious that the invention is not confined to grease guns but that it is applicable as well to couplings for conduits in general.

The principles of the invention are illustrated in several physical embodiments which are described in the following specification and illustrated in the accompanying drawings in which;

Figure 1 is a view in elevation of a grease gun embodying the features of the invention;

Figure 2 is a vertical section taken along the line 2—2 of Figure 1, the inner hollow cylindrical member or bushing being shown in elevation;

Figure 3 is a cross section taken along the line 3—3 of Figure 2, looking upward;

Figure 4 is a perspective view of the inner cylinder or bushing;

Figure 5 is a modified form of the grease gun shown in Figure 1, in which the barrel of the gun acts as the handle for effecting its coupling to the fitting;

Figure 6:
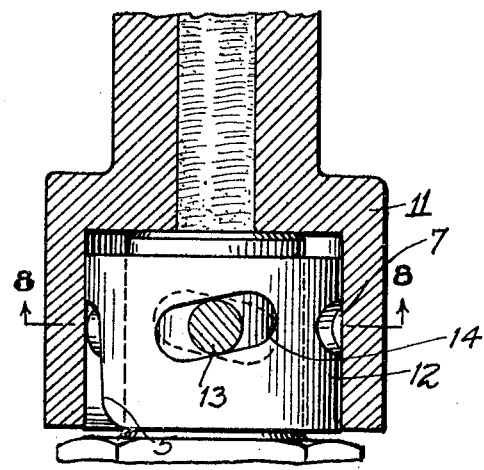
Figure 6 is a vertical section, (the bushing being shown in elevation,) of a modified form of the invention.

Referring now in detail to the several figures, and first adverting to that form of the invention shown in Figures 1 to 4, the numeral 1 represents in general a grease gun of that type described and claimed in my pending application, Serial No. 460,182 filed June 10, 1930, and which is designed particularly for extruding solid grease into the fittings of locomotive bearings. This type of gun is used to illustrate the present invention simply because it is convenient, and familiar to applicant, but it is understood that the coupling constituting the present invention could be used on any form of grease gun.

The grease gun has a barrel 2, the lower end of which is formed with a socket member 3. Said socket member is internally threaded as at 4, and retains in loosely threaded or floating condition a bushing 5. Said bushing has the bayonet slot 6 adapted to receive a pin 7 which projects transversely from opposite sides of a fitting 8 as clearly shown in Figure 3. The pin and bayonet slot fitting is broadly, quite common in grease guns and the mode of attaching the gun to the fitting is simple, the vertical portion of the bayonet slot being slipped downward over the pin, and the socket member being then rotated so as to bring the pin into the lateral arm of the bayonet slot. When the pin is so located the inner wall or shoulder of the socket member is presumed to be in intimate or fluid-tight contact with the outer face of the nipple or fitting, but it is clear from Figure 2 that if from repeated use, wear occurs between the pin and the walls of the lateral arm of the bayonet slot, the inner wall of the socket member may make very loose contact or no contact at all with the end of the fitting so that when pressure is applied in the extrusion of the grease, the grease gun may rise appreciably upon the fitting creating a leakage space between the gun and fitting through which some of the grease may extrude.

By the present improvement, since the bayonet slots are carried by the floating bushing, as soon as the pins 7 have reached the ends of the lateral branches of the bayonet slots, the bushings can turn no more, and if the inner shoulder of the socket member is not then in tightly pressed relation to the end of the fitting, further rotation of the coupling results in the socket member screwing down on the bushing, and into firm sealing contact with the end of the fitting. Regardless of how much the pin 7 of the cooperating surfaces of the bayonet slot may be worn, the threaded relation of the floating bushing to the socket member affords a practically inexhaustible range for adjustment of the socket member with respect to the fitting, so that a loose connection need not develop during the life of the grease gun.

Figure 1 shows that a handle 9 has been provided for turning the socket member in the act of connecting or disconnecting the coupling. In Figure 5, since the barrel of the gun extends at right angles to the socket member, it is unnecessary to provide a handle 9, since the barrel of the gun itself may be utilized as a handle.

For convenience, in quickly engaging the bayonet slots with the pins, the entrances to the bayonet slots are formed on a slope or bevel as shown at 10 in Figure 4.

In uncoupling the grease gun from the fitting it is merely necessary to turn the handle 9, or the barrel of the gun itself in that form shown in Figure 5, as the case may be, in the reverse direction from that of the coupling, whereupon the pin 7 will travel to the opposite end of the lateral branch 6 of the bayonet slot, and abutting against the wall at said end, it will hold the bushing against further rotation in the opposite direction, permitting the outer cylindrical member to unscrew upon said bushing, thus elevating the end wall of the socket member from the outer face of the fitting with which it has been in sealing contact.

Referring to Figures 6, 7, 8 and 9, a form of the invention is shown in which threads on the co-acting surfaces of the inner and outer cylindrical members are obviated without changing the function or principle of operation of the device. In this form of the invention, the adjacent cylindrical surfaces of the socket member 11 and bushing 12 are plane. The socket member is provided with inwardly projecting pins or lugs 13, and the bushing is formed with complementary inclined slots 14 into which the pins project and against the edges of which said pins coact. It will be apparent that the pins and slots are the equivalent of the inter-engaging threads shown in the first described modification. The bushing 12 is provided also, and preferably at points at right angles to the slots 14, with bayonet slots for engaging the pins on the fitting.

Figure 7:
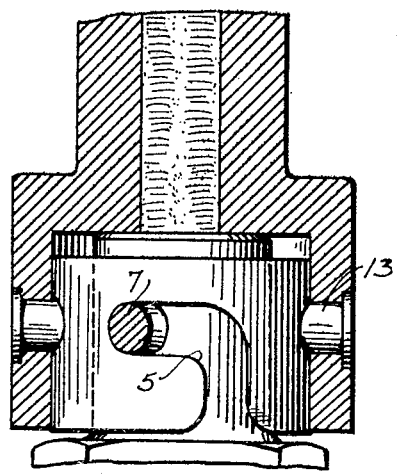
Figure 7 is a vertical section taken at right angles to the plane of the section shown in Figure 6.
Figure 8:
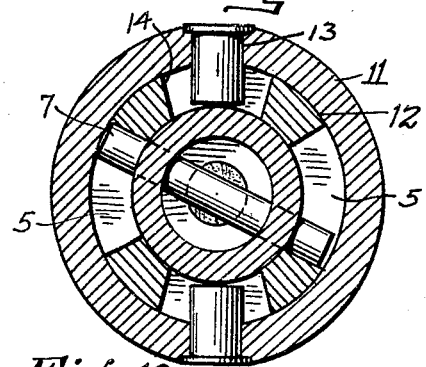
Figure 8 is a cross section taken along the line 8—8 of Figure 6 looking upward.
Figure 9:
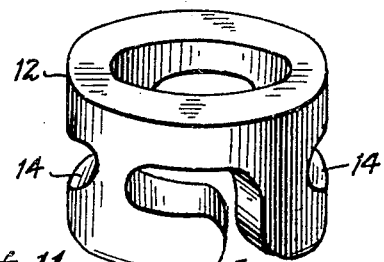
Figure 9 is a perspective view of the bushing of that form of the invention shown in Figures 6 to 8.

In attaching this coupling, the bayonet slots are first engaged with the pins 7 on the fitting, and then the socket member is turned so as to bring the pins to the extreme ends of the lateral arms of the bayonet slots as shown in Figure 7. During this movement, the bushing 12 may rotate with the outer cylindrical member, but if it does not, it is immaterial. When the pin 7 has reached the position shown in Figure 7, the bushing can no longer rotate and in consequence, the pin 13, rotating with the socket member 11 rides down in the slot 14, depressing the socket member and bringing it into intimate contact with the end of the fitting.

Figure 11:
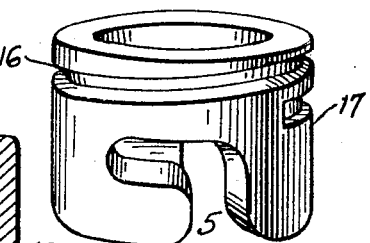
Figure 11 is a perspective view of the bushing used in this modification.
Figure 10:
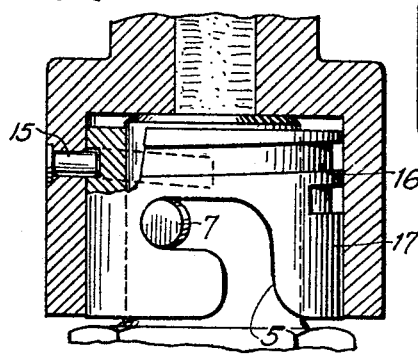
Figure 10 is a further modification of the invention.

Figures 10 and 11 show still another modification of the invention which is similar to the first form illustrated except that instead of the outer cylindrical member being formed with a continuous internal thread this is substituted by a pin or lug 15, which lug extends into a helical groove 16 formed on the outer cylindrical surface of the bushing 17. The pin and slot connection with the fitting is the same in this modification as in those previously described and the operation of making the connection and severing it is the same.

It will be understood from the above description that the invention may be carried out in a variety of ways and that the details of construction as shown are merely by way of example and not to be considered as limitative in their bearing upon the scope of the invention as claimed.

What I claim is:

1. Coupling for conduits comprising a nipple and socket member, said nipple being adapted to make sealing contact with the inner end wall of the socket member, said coupling including a bushing floating on a rigid inclined guide within said socket member, whereby when it is rotated relative to said socket member it moves endwise, means on said nipple and bushing interengaged by rotating said socket member, for rotating said bushing on said inclined guide relative to said socket member, said interengaged means having lost motion, effective in permitting said bushing and socket member to rotate as a unit by actualization of said socket member, until said lost motion is taken up.

2. Coupling for conduits comprising a nipple and a socket member, said nipple being adapted to make sealing contact with the inner end wall of the socket member, said coupling including a bushing floating on a rigid inclined guide within said socket member, whereby when it is rotated it moves endwise, means on said nipple and bushing interengaged by rotating said socket member for rotating said bushing on said inclined guide, said interengaging means having lost motion effective in permitting said bushing and socket member to rotate as a unit upon initial actualization of said socket member until said lost motion is taken up, said interengaging means comprising a pin on said nipple and an inclined slot in said bushing adapted when said bushing and socket member rotate unitarily, to move the inner end wall of said socket member endwise in proximity to said nipple.

3. Grease gun including a barrel and pressure producing means, said barrel having a socket member having an inner wall adapted to make sealing contact with the end of a nipple when said grease gun is periodically applied thereto and bushing in said socket member floating on a rigid inclined guide whereby when it is rotated it moves endwise, said bushing having means interengaged with means on said nipple by rotating said socket member, for rotating said bushing on said inclined guide, said interengaging means having lost motion effective in permitting said bushing and socket member to rotate as a unit upon the initial rotation of said socket member on said nipple, until said lost motion is taken up, said interengaging means comprising an inclined slot in said bushing and a pin on said nipple, said means being adapted when said bushing and socket member rotate unitarily to move said socket member endwise, bringing its inner ends more in proximity to the end of said nipple.

In testimony whereof I affix my signature.

EMMETT ADDISON DUNLAP.